United States Patent [19]
Takahashi

[11] Patent Number: 5,455,508
[45] Date of Patent: Oct. 3, 1995

[54] ROTATIONAL ANGLE SENSOR HAVING A MAGNETIC MEMBER MOUNTED ON A ROTATABLE SHAFT

[75] Inventor: Hajime Takahashi, Higashimatsuyama, Japan

[73] Assignee: Zexel Corporation, Tokyo, Japan

[21] Appl. No.: 132,869

[22] Filed: Oct. 7, 1993

[30] Foreign Application Priority Data

Oct. 20, 1992 [JP] Japan ................... 4-306369

[51] Int. Cl.⁶ ................................................. G01B 7/30
[52] U.S. Cl. ...................... 324/207.22; 324/207.18
[58] Field of Search ................. 324/207.11, 207.12, 324/207.15, 207.16, 207.19, 207.22, 207.25, 236, 228, 239, 260, 262

[56] References Cited

U.S. PATENT DOCUMENTS

| | | | |
|---|---|---|---|
| 3,961,243 | 6/1976 | Schulz | 324/207.19 |
| 4,053,849 | 10/1977 | Bower et al. | 324/207.19 X |
| 4,841,245 | 6/1989 | Fiori, Jr. | 324/236 X |
| 4,845,429 | 7/1989 | Burreson | 324/207.19 |
| 5,126,665 | 6/1992 | Hachtel et al. | 324/207.19 |
| 5,175,497 | 12/1992 | Dobler et al. | 324/207.25 |
| 5,394,082 | 2/1995 | Schiessle et al. | 324/207.19 |

FOREIGN PATENT DOCUMENTS

| | | |
|---|---|---|
| 2940083 | 4/1981 | Germany . |
| 3931423 | 1/1991 | Germany . |
| 1482705 | 8/1977 | United Kingdom . |

*Primary Examiner*—Sandra L. O'Shea
*Assistant Examiner*—Warren S. Edmonds
*Attorney, Agent, or Firm*—Sughrue, Mion, Zinn, Macpeak & Seas

[57] ABSTRACT

A rotational angle sensor includes a cylindrical bobbin, a freely-rotatable shaft provided at the center portion of the bobbin so as to extend in a direction vertical to the central axis of the bobbin, two coils which are wound between the center portion of the bobbin and one side portion thereof and between the center portion of the bobbin and the other side portion thereof, respectively, and a magnetic (or non-magnetic) member which is linked to the shaft so as to be freely rotatable in the bobbin such that a rate at which the magnetic member is deviationally located at one side of the two coils is varied in accordance with a rotational angle, whereby the rotation of the shaft is reflected to the variation of the inductance ratio of the two coils. When the non-magnetic member is used, magnetic fluid is filled in the bobbin.

8 Claims, 3 Drawing Sheets

ROTATIONAL ANGLE SENSOR HAVING A MAGNETIC MEMBER MOUNTED ON A ROTATABLE SHAFT

BACKGROUND OF THE INVENTION

1. Field of the Invention

This invention relates to a rotational angle sensor for detecting a rotational angle.

2. Description of Related Art

Conventionally, a resistor-type of sensor has been most frequently used as a rotational angle sensor. This resistor-type of sensor comprises a resistor and a bush which is rotatably in contact with-the resistor. This type of resistor is designed to be in construction and low in cost, however, it has a short life-time because it suffers abrasion through contact resistance of the brush. This abrasion problem is more critical particularly for a vehicle or the like which is driven under a severe vibration condition because the abrasion is promoted under such a condition.

In view of the foregoing, various kinds of non-contact type of rotational angle sensors have been recently used. In one of these sensors, an inductance ratio between two coils is measured to detect a rotational angle. This type of sensor is disclosed in Japanese Laid-open publication (internal laid-open application) No. 3-506071.

This publication discloses two types of sensors. One type of sensor is so designed that two coils, each having a semi-circular section, are arranged to confront each other, thereby forming a columnar coil member, and a magnetic member having a semi-arcuate section is engaged along the outer wall of the columnar member so as to be freely rotatable around the rotational center of the columnar member. On the other hand, the other sensor is so designed that two coils, each having a semi-arcuate section, are arranged to confront each other, thereby forming a cylindrical (hollow cylindrical) member, and a magnetic member having a semi-arcuate section is inserted into the inner space of the cylindrical member so as to be freely rotatable around the rotational center of the cylindrical body. Both types of sensors adopt the principle of detecting a rotational angle on the basis of a phenomenon that the inductance ratio between the two coils is variable in accordance with the rotational angle of the magnetic body.

One problem of the above conventional device for detecting the inductance ratio is that fabrication of a product is cumbersome. That is, the process of forming coils having a semi-circular or a semi-arcuate section and arranging two coils thus formed to fabricate a columnar or cylindrical (hollow cylindrical) member is more cumbersome and higher in cost in comparison with a process of forming a normal simple cylindrical coil. Further, in this device, if the positioning between the columnar or cylindrical member and the rotating magnetic member is not accurately carried out, the gap balance between these members in the rotational direction is lost, and it causes reduction of output precision, such as deterioration in linearity of the output and occurrence of offset.

Further, in the case where a magnetic shield is provided around the outer periphery of the device to remove external noises, particularly in the former device, most of the effective magnetic flux emitted from the coil is passed through the magnetic shield without being passed through the rotating magnetic member if the distance from the coil to the magnetic shield is not set to be longer than at least the distance from the coil to the rotating magnetic member, and this part of the effective magnetic flux does not contribute to the detection of a rotational angle. Accordingly, the magnetic shield must be provided away from the coil, and thus the device must be designed to be large in size.

SUMMARY OF THE INVENTION

An object of this invention is to provide an improved rotational angle sensor for detecting the inductance variation of a coil, which can be produced with a simpler construction and an easier fabrication process in comparison with a conventional device, and which has sufficiently excellent output precision.

In order to attain the above object, the rotational angle sensor according to this invention includes a cylindrical bobbin, a freely-rotatable shaft provided at the center portion of the bobbin so as to extend in a direction vertical to the central axis of the bobbin, two coils which are wound between the center portion of the bobbin and one side portion thereof and between the center portion of the bobbin and the other side portion thereof, respectively, and a magnetic member which is linked to the shaft so as Lo be freely rotatable in the bobbin such that a rate at which the magnetic member is deviationally located at one side of the two coils is varied in accordance with a rotational angle, whereby the rotation of the shaft is reflected to the variation of the inductance ratio of the two coils.

According to the rotational angle sensor of this invention, in the construction as described above, magnetic fluid may be filled into the bobbin, and, in place of the magnetic member, a non-magnetic member may be secured to the shaft.

Through the rotation of the shaft, the rate at which the magnetic member or the magnetic fluid is deviationally located at one coil side is varied, and thus the inductance ratio of the two coils is also varied. The rotational angle can be measured by detecting the inductance ratio. This sensor has a relatively-simple construction and can be easily fabricated. Particularly, the coil is merely wound around-the cylindrical bobbin, and thus it can be more easily produced than a conventional coil having a special shape. Further, when a magnetic field is provided at the outside, the effective magnetic flux is passed through the magnetic shield and the magnetic member (or magnetic fluid) in the bobbin, so that unlike the conventional device, no effective magnetic flux is monopolized by the magnetic shield.

DETAILED DESCRIPTION OF THE PREFERRED EMBODIMENTS

Preferred embodiments according to this invention will be described hereunder with reference to the accompanying drawings.

Figure 1:
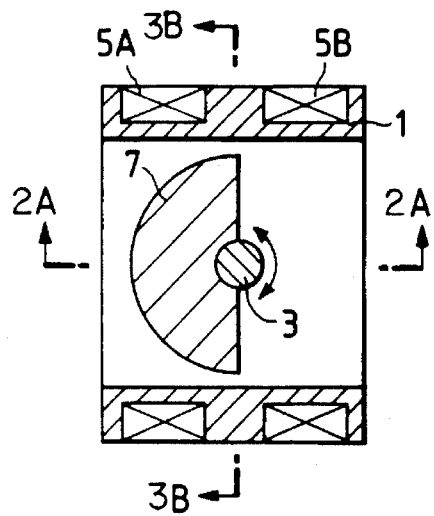
FIG. 1 is a cross-sectional view of an embodiment of a rotational angle sensor according to this invention.
Figure 2:
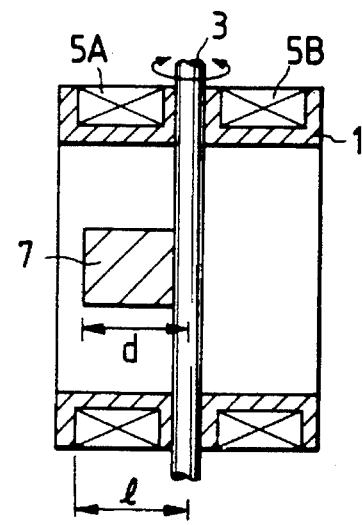
FIG. 2 is a cross-sectional view of the embodiment which is taken along a line 2—2.
Figure 3:
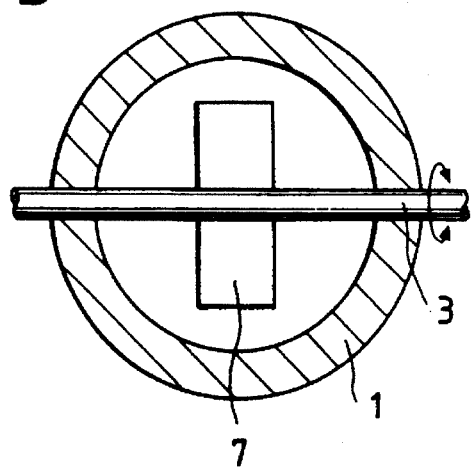
FIG. 3 is a cross-sectional view of the embodiment which is taken along a line 3—3.

FIG. 1 is a cross-sectional view of an embodiment of the rotational angle sensor according to this invention, and FIGS. 2 and 3 are cross-sectional views of the rotational angle sensor as shown in FIG. 1, which are taken along lines 2—2 and 3—3, respectively.

In FIGS. 1 to 3, a shaft 3 is provided at the center portion of a cylindrical bobbin 1 so as to extend in a direction vertical to the center axis of the bobbin 1. The shaft 3 is freely rotatably supported in the bobbin 1. In this embodiment, the shaft 3 is so illustrated that it completely penetrates through the bobbin 1 and both ends thereof stick out of the bobbin 1. However, another structure wherein one end of the shaft 3 sticks out of the bobbin 1 and the other end is located in the bobbin 1 may be adopted in place of the above structure.

Both the bobbin 1 and the shaft 3 are formed of non-magnetic material, and two cylindrical coils 5A and 5B are wound around the outer peripheral surface of the bobbin 1.

The one coil 5A of the two coils is wound around a half part of the bobbin 1 which is located from the center portion of the bobbin 1 to one side thereof (around the left side portion of the bobbin 1 in FIGS. 1 and 2), and the other coil 5B is wound around the other half part of the bobbin 1 which is located from the center portion of the bobbin 1 to the other side thereof (around the right side portion of the bobbin 1 in FIGS. 1 and 2). These coils 5A and 5B are symmetrically disposed with respect to the center axis of the shaft 3. A semi-cylindrical core 7 of ferromagnetic material is secured to the center of the shaft 3, and the core 7 is rotated together with the shaft 3 in a direction as indicated by an arrow.

The radius d of the core 7 (the distance from the center of the shaft to the outer periphery of the core) is set to be approximately equal to the length l of the coils 5A and 5B (the distance from the center of the shaft to the edge of the coil).

The shaft 3 is connected to a detection target (an object to be measured), and the core 7 is rotated in the bobbin 1 in synchronism with the rotation of the detection target.

In accordance with a rotational angle of the core 7 are varied an occupational rate of the core 7 which serves as a core for the coil 5A in a space defined by the coil 5A and an occupational rate of the core 7 which serves as a core for the coil 5B in a space defined by the coil 5B. Therefore, the inductance ratio of the coils 5A and 5B is also varied.

Figure 4:
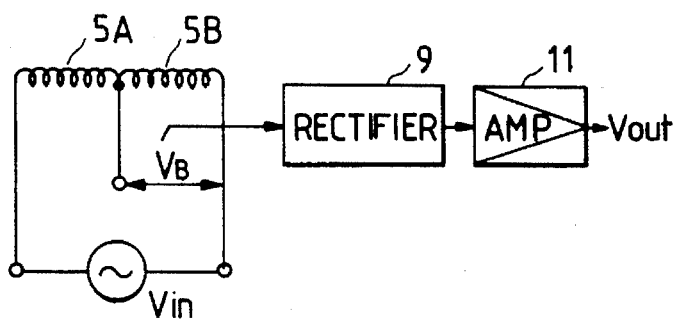
FIG. 4 is a circuit diagram showing an electrical connection of the embodiment.

FIG. 4 is a circuit diagram showing an electrical connection state of the rotational angle sensor thus formed. The coils 5A and 5B are connected to each other in series, and a high-frequency constant alternating voltage Vin is applied across both ends of the in-series connected coils. A voltage VB occurring across both ends of the one coil 5B is picked up, and then passed through a rectifier 9 and an amplifier 11 to be converted to a D.C. output voltage Vout.

Figure 5:
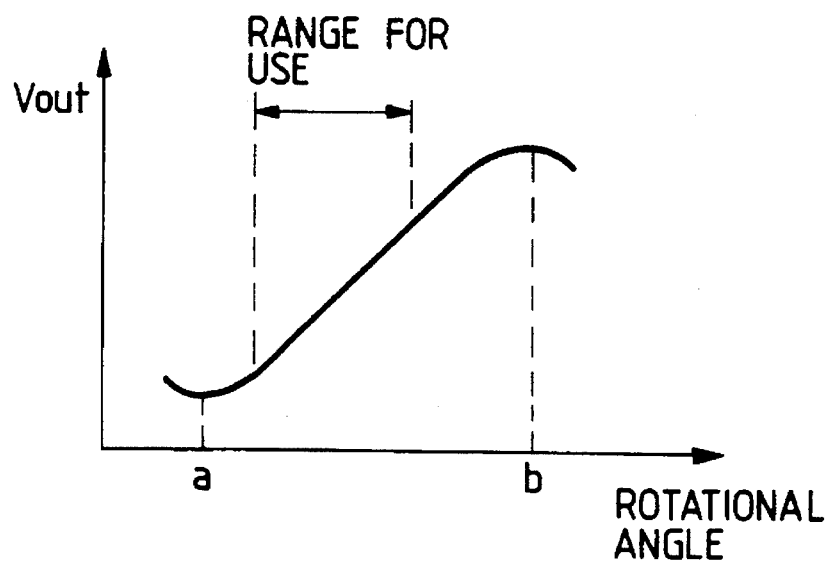
FIG. 5 is a graph showing an output characteristic of the embodiment.

FIG. 5 is a graph showing the relationship between the output voltage Vout and the rotational angle of the core 7. In this graph, the rotational angle a corresponds to an angle at which the core 7 is completely located at the coil 5A side as shown in FIG. 1, and the rotational angle b corresponds to an angle at which the core 7 as shown in FIG. 1 is rotated by 180° and completely located at the coil 5B side which is opposite to the coil 5A side.

As described above, the inductance ratio of the coils 5A and 5B is varied in accordance with the rotational angle of the core 7, and the output voltage Vout is varied as shown in FIG. 5. The rotational angle sensor of this embodiment is used in such a linearly-varying range of the variation curve as shown in FIG. 5 that no problem occurs for practical use.

One advantage of this rotational angle sensor is that the construction thereof is simpler and the fabrication of a product is easier in comparison with the conventional device as described above.

Figure 6:
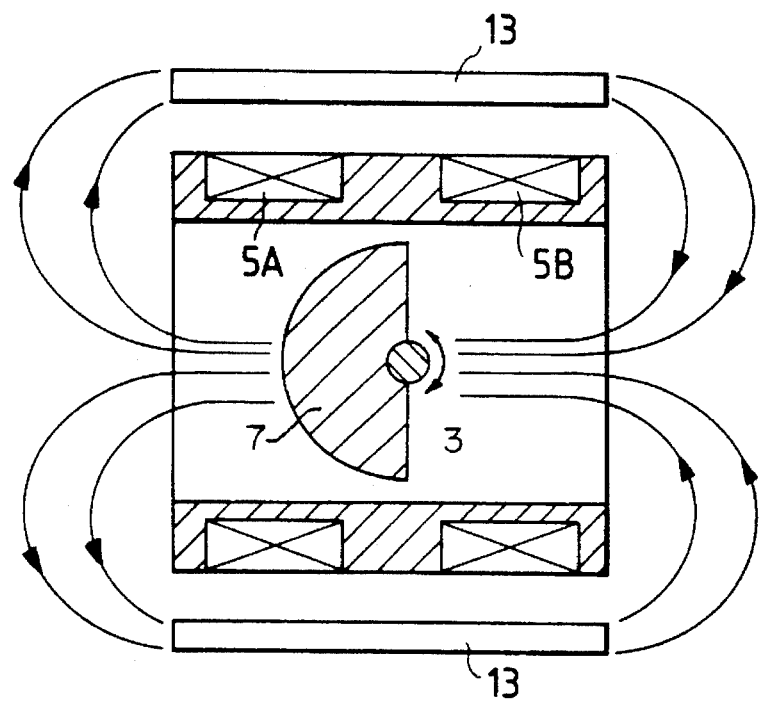
FIG. 6 is a diagram showing a magnetic flux passageway when a magnetic shield is provided in the embodiment.

Particularly as to the coils 5A and 5B, it is sufficient to merely wind the coil around the cylindrical bobbin 1, and thus the fabrication process of this embodiment is more simplified in comparison with the fabrication process of Forming two coils having a semi-circular or a semi-arcuate section and arranging the coils in parallel to produce the conventional device. Another advantage of the present invention is as follows. When the magnetic shield is provided at the outside, as shown in FIG. 6, most of the effective magnetic flux emitted from the coils 5A and 5B is passed through the core 7 and then passed through the magnetic shield 13. Therefore, this embodiment has no problem inherent to the conventional device wherein most of the effective magnetic flux is not passed through the core, but passed through only the magnetic shield, and it does not contribute to the detect/on of the rotational angle.

Accordingly, the magnetic shield can be disposed near in the vicinity of the coils 5A and 5B, and thus miniaturization of the whole device can be easily performed. Further, the output precision is excellent.

Figure 7:
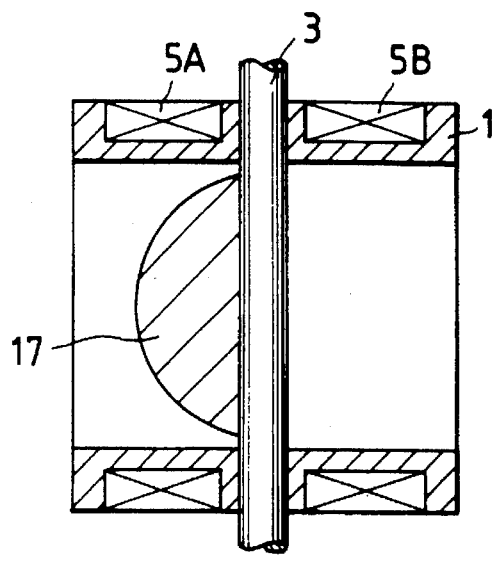
FIG. 7 is a cross-sectional view of another embodiment according to this invention, which is taken along-the same line as shown in FIG. 2.
Figure 8:
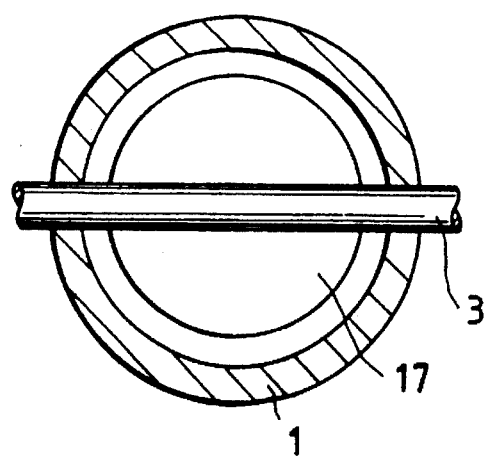
FIG. 8 is a cross-sectional view of the embodiment as shown in FIG. 7, which is taken along the same line as shown in FIG. 3.

FIGS. 7 and 8 are cross-sectional views of another embodiment of this invention, which are viewed from the same directions as shown in FIGS. 2 and 3. This embodiment has substantially the same construction as the above embodiment, except that the core 17 is designed in a semi-spherical shape.

Since the core 17 of this embodiment is designed in a semi-spherical shape, it is expected that more effective flux can contribute to the detection of the rotational angle in comparison with the above embodiment using the semi-circular core 7.

Figure 9:
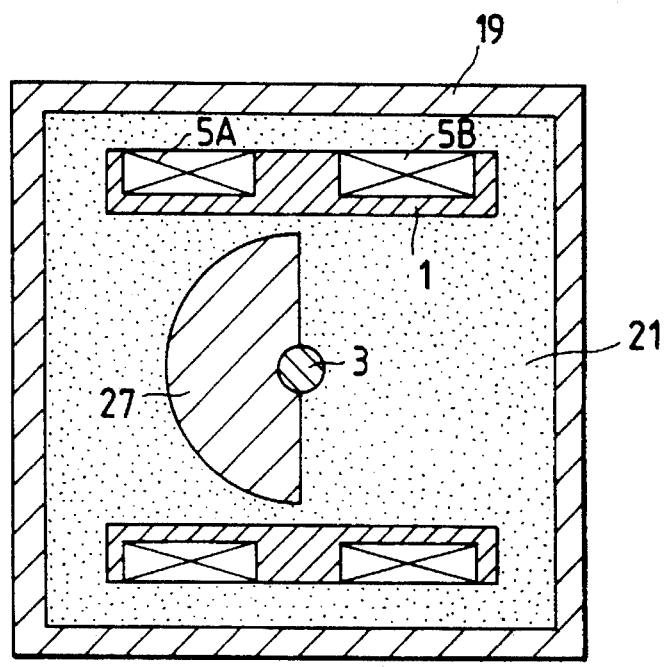
FIG. 9 is a cross-sectional view of another embodiment according to this invention.

FIG. 9 is a cross-sectional view of another embodiment of the rotational angle sensor according to this invention, and it is viewed from the same direction as FIG. 1. This embodiment is characterized in that the sensor is wholly accommodated in a sealed vessel 19, magnetic fluid 21 is filled in the vessel 19 and the core 27 is formed of non-magnetic material. The shape of the core 27 may be semi-cylindrical or semi-spherical in shape. The other construction is identical between this embodiment and the above embodiment.

In this embodiment, Following the rotation of the core 27, the magnetic flux 21 is pushed and moved toward the coil 5A side or 5B side by the core 27, whereby the inductance ratio of the coils 5A and 5B is varied.

This invention is not limited to the above embodiments, and this invention is applicable even by making various modifications to the embodiments as described above. For example, the shape of the bobbin 1 is not limited to the cylindrical shape, but may be a prismatic shape.

As described above, according to this invention, the non-contact type of rotational angle sensor having excellent output precision can be implemented with a simple construction and in an easy fabrication process.

What is claimed is:

1. A rotational angle sensor comprising:

a bobbin having a central axis and a pair of spaced apart side edges;

a freely-rotatable shaft provided at a center portion of said bobbin so as to extend in a direction vertical to the central axis of said bobbin;

two coils which are wound around a half part of said bobbin between the center portion of said bobbin and one side edge thereof and around the other half part of said bobbin between the center portion of said bobbin and the other edge thereof, respectively; and a magnetic member which is linked to said shaft so as to be freely rotatable in said bobbin such that a rate at which said magnetic member is deviationally located at one side of said two coils is varied in accordance with a rotational angle of said shaft, thereby reflecting the rotational angle of said shaft to the variation of the inductance ratio of said two coils.

2. The rotational angle sensor as claimed in claim 1, further comprising means for converting the variation of the inductance ratio of said two coils into a voltage signal to detect the rotational angle on the basis of the output voltage signal.

3. The rotational angle sensor as claimed in claim 1, wherein said bobbin has a cylindrical shape.

4. The rotational angle sensor as claimed in claim 1, wherein said magnetic member has one of a semi-cylindrical and a semi-spherical shape.

5. A rotational angle sensor comprising:

a bobbin having a central axis and a pair of spaced apart side edges;

a freely-rotatable shaft provided at a center portion of said bobbin so as to extend in a direction vertical to the central axis of said bobbin;

two coils which are wound around a half part of said bobbin between the center portion of said bobbin and one side edge thereof and around the other half part of said bobbin between the center portion of said bobbin and the other edge thereof, respectively;

magnetic fluid filled in said bobbin; and a non-magnetic member which is linked to said shaft so as to be freely rotatable in said bobbin such that a rate at which said non-magnetic member is deviationally located at one side of said two coils is varied in accordance with a rotational angle of said shaft, the rotation of said non-magnetic member inducing non-uniformity of the magnetic fluid in said bobbin to thereby reflect the rotational angle of said shaft to the variation of the inductance ratio of said two coils.

6. The rotational angle sensor as claimed in claim 5, further comprising means for converting the variation of the inductance ratio of said two coils into a voltage signal to detect the rotational angle on the basis of the output voltage signal.

7. The rotational angle sensor as claimed in claim 5, wherein said bobbin has a cylindrical shape.

8. The rotational angle sensor as claimed in claim 5, wherein said non-magnetic member has one of a semi-cylindrical and a semi-spherical shape.

* * * * *